Oct. 6, 1931.  A. J. REYNOLDS  1,825,982
CUSHION TIRE
Filed Aug. 22, 1927
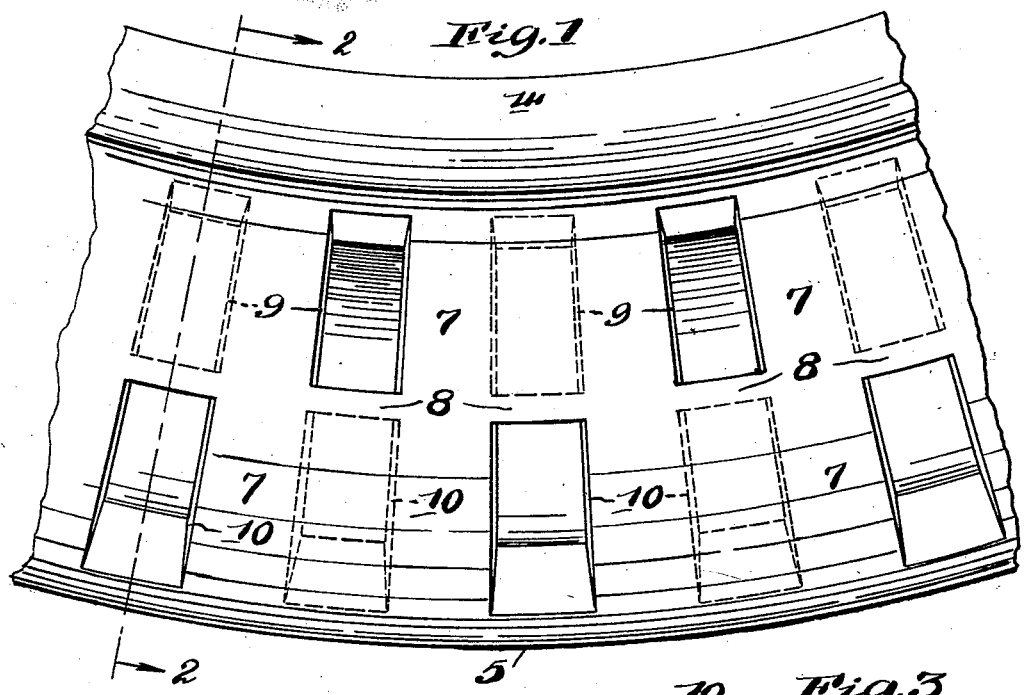
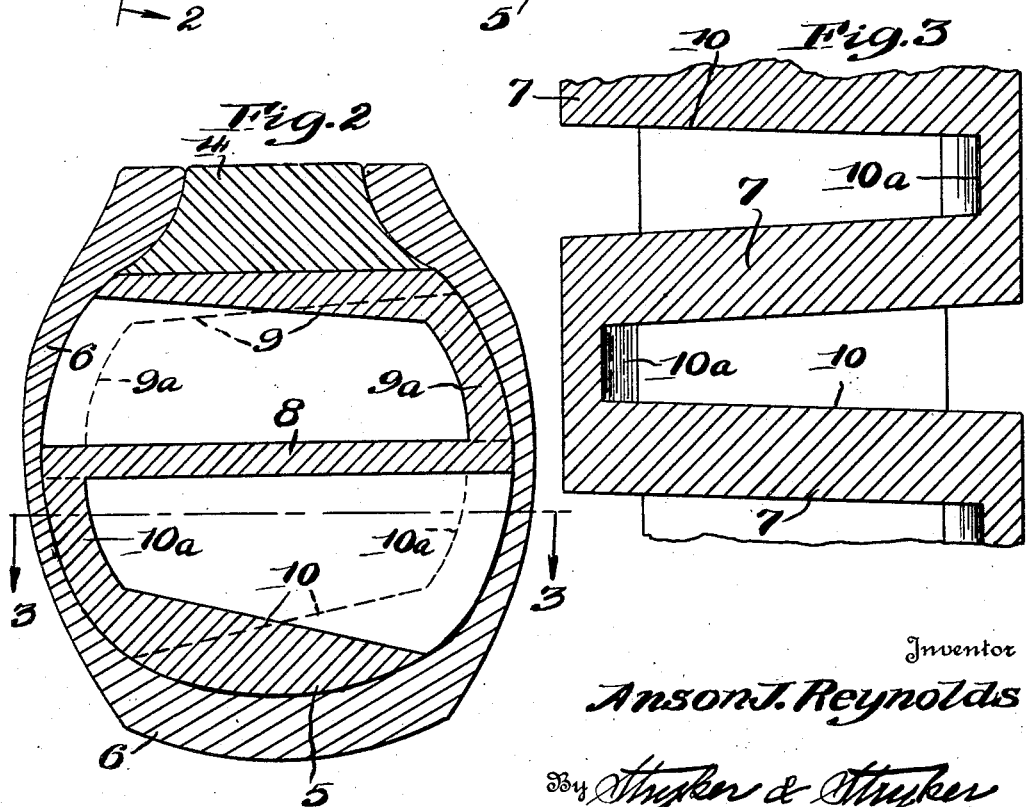
Inventor
Anson J. Reynolds
By Stryker & Stryker
Attorneys Patented Oct. 6, 1931

1,825,982

UNITED STATES PATENT OFFICE

ANSON J. REYNOLDS, OF ST. PAUL, MINNESOTA

CUSHION TIRE

Application filed August 22, 1927. Serial No. 214,514.

It is my object to provide a cushion tire having a novel and efficient arrangement of openings whereby greater resiliency is imparted to the tire while reducing its cost to a minimum.

A further object is to provide a tire of this kind which can be readily molded and requires a minimum of rubber or other material in its construction.

The invention will be best understood by reference to the accompanying drawings in which Figure 1 is a fragmentary side elevation of my improved cushion tire; Fig. 2 is a section taken on the line 2—2 of Fig. 1 and showing a suitable casing in place on the tire; and Fig. 3 is a typical section taken on the line 3—3 of Fig. 2.

My improved tire, which is formed from rubber or other suitable resilient material, has the common substantially toric form. The inner periphery 4 is adapted to be secured to a tire rim in the usual manner and the outer periphery 5 or tread portion is adapted to be covered by a casing 6 (Fig. 2). Extending radially outward from the rim portion 4 is a series of piers 7, each of substantially uniform width from its outer to its inner end. These piers 7 are connected by transverse members 8 which extend in a circular path about the tire and constitute a reinforcing member approximately midway between the tread and rim of the tire. The piers 7 and transverse members 8 are formed by an inner series of openings 9 and an outer series of openings 10. Each of the several openings 9 and 10 extends in from a side of the cushion tire but does not entirely penetrate through the opposite side wall. Thus the openings 9 and 10 are closed at their ends 9a and 10a respectively. These openings, which are substantially rectangular in cross section, are formed to flare from their closed ends toward their open ends, as clearly shown in Fig. 2. This facilitates separation of the molds for forming the tire as hereinafter described. The openings 9 and 10 are arranged in pairs, the openings of each pair extending in from opposite sides of the tire as shown in Fig. 3. It will further be noted that each opening 10 is located radially outward from an opening 9, and that the adjacent radially spaced openings extend in from opposite sides of the tire as shown in Fig. 2. By reason of the flaring forms of the openings 9 and 10, the piers 7 are caused to extend obliquely across the tread of the tire as shown in Fig. 3. Obviously, the piers 7 may be tapered somewhat from the outer toward their inner ends, but it is important to note that no waste material is incorporated therein because they extend in the direction of the principal compressing forces. I prefer to so construct these piers that they are substantially uniform in width from their outer to their inner ends.

By reason of my peculiar arrangement of the piers and transverse members and the form of the openings 9 and 10, the operation of molding the tire is greatly facilitated. Thus a two part mold, having projections of the form of the openings 9 and 10 may be employed, the parts of the mold forming the opposite side walls of the tire, being separable, and each having suitable projections adapted to be maintained in spaced relation laterally and radially relative to the projections on the opposite part of the mold.

It will now be understood that a minimum of rubber or other material from which the tire is formed is incorporated in my tire because the openings 9 and 10 occupy a maximum of space consistent with a strong and resilient structure. There is no waste material incorporated in the piers 7 and transverse members 8.

Having described my invention what I claim as new and desire to protect by Letters Patent is:

1. A cushion tire comprising a body of resilient material having substantially toric form, a series of radially extending piers formed by two series of openings extending in from the sides of said body, each of said piers being continuous in a radial direction from the rim to the tread of the tire and being substantially uniform in width from its inner to its outer end, one of said series of openings being located radially outward from the other series and each opening extending in from one side of the tire substantially to the other side, leaving a continuous tread of substantial width, and leaving transverse connecting members extending between said piers and forming an annular reinforcement between the outer and inner series of openings.

2. A cushion tire comprising a body of resilient material having substantially toric form, a series of radially extending piers formed by two concentric series of openings arranged in pairs and extending in from the sides of said body, one opening of each pair being located directly outward from the other in a radial direction, each opening extending more than half way through said body and being narrow and relatively long in a radial direction, and transverse reinforcing members extending between said piers, said reinforcing members and piers being integral portions of the homogeneous tire body and said piers constituting the principal supporting members and the tire being without a continuous radial, longitudinally extending supporting member.

3. A cushion tire comprising a body of resilient material having substantially toric form and rim and tread peripheries, a series of piers, each continuous radially from said rim to said tread peripheries and formed by two concentric series of openings arranged in pairs and extending in from the sides of said body, each opening extending more than half way through said body, and the outer series of openings being spaced radially inward from the tread, said piers being narrow, relatively long and substantially equal in width to the width of said openings and relatively thin, transverse, reinforcing members extending between said piers approximately midway between the rim and thread peripheries, said reinforcing members, rim and tread peripheries and piers being integral portions of the homogeneous tire body.

4. A cushion tire comprising a body of resilient material having substantially toric form, a series of radially extending piers formed by two concentric series of openings arranged in pairs and extending in from the sides of said body, each opening being of substantially rectangular cross sectional shape, said piers being continuous radially from the rim to the tread of said tire and from side to side thereof and being of substantially uniform width from their inner to their outer ends, and transverse reinforcing members connecting said piers between their outer and inner ends, said reinforcing members and piers being integral portions of the homogeneous tire body and said piers being the principal sustaining members of the tire and the tire being without continuous, radially and longitudinally extending supporting member.

In testimony whereof, I have hereunto signed my name to this specification.

ANSON J. REYNOLDS.